(12) United States Patent
Yang et al.

(10) Patent No.: US 11,543,343 B2
(45) Date of Patent: Jan. 3, 2023

(54) ROAD FRICTION ESTIMATION

(71) Applicant: Volvo Car Corporation, Gothenburg (SE)

(72) Inventors: Derong Yang, Gothenburg (SE); Mats Jonasson, Partille (SE)

(73) Assignee: Volvo Car Corporation, Gothenburg (SE)

(*) Notice: Subject to any disclaimer, the term of this patent is extended or adjusted under 35 U.S.C. 154(b) by 657 days.

(21) Appl. No.: 16/562,239

(22) Filed: Sep. 5, 2019

(65) Prior Publication Data

US 2021/0072147 A1    Mar. 11, 2021

(51) Int. Cl.
*G01N 19/02* (2006.01)
*B60W 30/18* (2012.01)

(52) U.S. Cl.
CPC .............. *G01N 19/02* (2013.01); *B60W 30/18* (2013.01); *B60W 2552/40* (2020.02); *B60W 2554/00* (2020.02); *B60W 2555/20* (2020.02); *B60W 2720/28* (2013.01)

(58) Field of Classification Search
CPC ...... G08G 1/22; G05D 1/0287; G05D 1/0027; G01N 19/02; B60W 30/18; B60W 2552/40; B60W 2554/00; B60W 2555/20; B60W 2720/28
See application file for complete search history.

(56) References Cited

U.S. PATENT DOCUMENTS

| | | | |
|---|---|---|---|
| 5,747,682 A | 5/1998 | Hirano | |
| 6,473,682 B2 | 10/2002 | Nakamura | |
| 6,549,842 B1 | 4/2003 | Hac et al. | |
| 6,597,980 B2 | 7/2003 | Kogure | |
| 6,650,987 B2 * | 11/2003 | Kogure | B60T 8/172 701/80 |
| 6,659,570 B2 | 12/2003 | Nakamura | |
| 8,682,599 B2 | 3/2014 | Shiozawa et al. | |
| 8,983,749 B1 | 3/2015 | Singh | |
| 9,073,566 B2 | 7/2015 | Takenaka et al. | |

(Continued)

FOREIGN PATENT DOCUMENTS

EP          3106360 B1    4/2018

OTHER PUBLICATIONS

"ZF: Active Kinematics Control: Steering Impulses from the Rear Axle," Auto Components of India, Feb. 6, 2015, 6 pp.

(Continued)

*Primary Examiner* — Peter D Nolan
*Assistant Examiner* — Tanya C Sienko
(74) *Attorney, Agent, or Firm* — Shumaker & Sieffert, P.A.

(57) ABSTRACT

Techniques are described for dynamically selecting vehicles to perform road friction probing maneuvers and estimating road friction based on sensor data collected while a vehicle performs the road friction probing maneuvers. In one example, a computing system is configured to select, from a plurality of vehicles, based on an amount of elapsed time since each respective vehicle of the plurality of vehicles has performed a road friction probing maneuver, a vehicle to perform the road friction probing maneuver within a road segment of a roadway, and responsive to selecting the vehicle, output, to the vehicle, a command causing the vehicle to perform the road friction probing maneuver within the road segment.

20 Claims, 4 Drawing Sheets

(56) References Cited

U.S. PATENT DOCUMENTS

| | | | |
|---|---|---|---|
| 9,475,500 B2* | 10/2016 | Grimm | G08G 1/0133 |
| 9,944,132 B2 | 4/2018 | Israelsson et al. | |
| 10,018,472 B2* | 7/2018 | Rander | B60W 40/068 |
| 10,144,433 B2* | 12/2018 | Jonasson | B60W 40/068 |
| 10,407,076 B2 | 9/2019 | Luo et al. | |
| 2006/0015236 A1 | 1/2006 | Yamaguchi et al. | |
| 2006/0041365 A1 | 2/2006 | Mori | |
| 2006/0273657 A1 | 12/2006 | Wanke et al. | |
| 2008/0262692 A1 | 10/2008 | Kogure et al. | |
| 2009/0118905 A1 | 5/2009 | Takenaka et al. | |
| 2011/0209521 A1 | 9/2011 | Shiozawa et al. | |
| 2011/0218700 A1 | 9/2011 | Mori et al. | |
| 2011/0282627 A1* | 11/2011 | Jang | G08G 1/0112 |
| | | | 702/179 |
| 2014/0365062 A1* | 12/2014 | Urhahne | B60K 28/066 |
| | | | 701/23 |
| 2016/0171884 A1* | 6/2016 | Chen | G01C 7/04 |
| | | | 701/117 |
| 2017/0101095 A1* | 4/2017 | Nilsson | B60W 30/143 |
| 2018/0105181 A1 | 4/2018 | Skold et al. | |
| 2019/0126933 A1 | 5/2019 | Jonasson et al. | |
| 2019/0271614 A1* | 9/2019 | Ahner | B60W 30/095 |
| 2020/0079381 A1* | 3/2020 | Lombrozo | B62D 6/003 |
| 2020/0189567 A1* | 6/2020 | Silver | B60W 60/001 |
| 2021/0064019 A1* | 3/2021 | Choi | G05D 1/0246 |
| 2021/0171044 A1 | 6/2021 | Kim | |
| 2021/0188284 A1 | 6/2021 | Hassel et al. | |

OTHER PUBLICATIONS

Ahn et al. "Robust Estimation of Road Friction Coefficient," 2011 American Control Conference, Jun. 2011, pp. 3948-3953.

Li et al., "Integrated Longitudinal and Lateral Tire/Road Friction Modeling and Monitoring for Vehicle Motion Control," IEEE Transactions on Intelligent Transportation Systems, vol. 7, No. 1, Mar. 2006, 19 pp.

Maoqi et al., "The effect of parallel steering of a four-wheel drive and four-wheel steer electric vehicle during spinning condition: a numerical simulation," IOP Conference Series: Materials Science and Engineering, Mar. 2019, 12 pp.

Shekhar, "Stability Analysis during Active Tire Excitation for Friction Estimation," KTH Royal Institute of Technology; School of Engineering Sciences, 2017, 90 pp. (Applicant points out, in accordance with MPEP 609.04(a), that the year of publication, 2017, is sufficiently earlier than the effective U.S. filing date, so that the particular month of publication is not in issue.).

U.S. Appl. No. 16/725,965, by Hassel et al., filed Dec. 23, 2019.

Pacejka, "Tire and Vehicle Dynamics (Third Edition)," Science Direct, Elsevier, 2012; Chapter 3, Section 3.2.3 Interaction between Lateral and Longitudinal Slip (Combined Slip) pp. 100-111, and Chapter 4, Section 4.2.2 Combined Slip Conditions pp. 158-162. (Applicant points out, in accordance with MPEP 609.04(a), that the year of publication, 2012, is sufficiently earlier than the effective U.S. filing date, so that the particular month of publication is not in issue.).

\* cited by examiner

ROAD FRICTION ESTIMATION

TECHNICAL FIELD

This disclosure relates to computing systems for estimating road friction.

BACKGROUND

Some vehicles feature autonomous or semi-autonomous driving capabilities that enable the vehicle to automatically control various aspects of the vehicle while driving. For example, a vehicle computing system of the vehicle may control the steering to keep the vehicle within a lane or control a speed of the vehicle to maintain a safe following distance. A vehicle may estimate road friction (e.g., a co-efficient of friction between the tires and the road surface) and adjust an actual speed of the vehicle based on the estimated road friction. The vehicle may excite the tires to estimate the road friction, for example, by accelerating longitudinally or cornering. Exciting the tires of any one vehicle too often may increase wear and tear on the vehicle and/or negatively affect the driving experience.

SUMMARY

In general, the disclosed subject matter relates to techniques for dynamically selecting vehicles to perform road friction probing maneuvers and estimating road friction based on sensor data collected while a vehicle performs the road friction probing maneuvers. A computing system selects one or more segments of one or more roadways for which to estimate the road friction. For example, the computing system may select a road segment when the friction for that road segment has not been estimated for at least a threshold amount of time, when the weather in the area of the road segment changes (e.g., temperatures drop below a threshold temperature or precipitation begins), etc.

The computing system predicts one or more vehicles that will traverse the selected segments within a period of time. In one example, the computing system determines whether any of the vehicles predicted to traverse a selected road segment have performing a road friction probing maneuver) of any road within a period of time. The computing system selects one of the vehicles that has not performed a road friction probing maneuver within the threshold amount of time and outputs a command causing the vehicle to perform the road friction probing maneuver when the vehicle traverses the selected road segment.

According to some examples, sensors of the vehicle generate sensor data while the vehicle performs the road friction probing maneuver. The vehicle and/or computing system may estimate the road friction within the road segment based at least in part on the sensor data. The computing system may update a road friction map indicative of road friction in different road segments, and may output or transmit all or a portion of the road friction map to one or more vehicles. The vehicle may adjust operations of the vehicle based on the road friction map. In one example, the vehicle may adjust its speed and/or following distance based on the road friction map.

In this way, a computing system may dynamically determine segments of roadway for which to estimate the road friction (or to update the estimate of road friction). By dynamically determining which segments of roadway to estimate the road friction, the computing system may increase the coverage of a road friction map. Increasing the coverage of the road friction map may enable a vehicle to more accurately adjust operations of the vehicle, for example, by setting a speed and/or following distance to reduce or prevent collisions. Reducing or preventing collisions may increase safety of the vehicle passengers and reduce property damage.

Moreover, dynamically selecting vehicles to perform road friction probing maneuvers may enable the computing system to reduce the number of road friction probing maneuvers performed by any given vehicle. Reducing the number of road friction probing maneuvers performed by a given vehicle may reduce wear and tear on the vehicles that may be caused by performing road friction probing maneuvers, and may increase the user or driver experience by reducing vibrations that may be caused when performing road friction probing maneuvers.

In one example, a computing system is described. The computing system includes at least one processor and a memory. The memory includes instructions that, when executed, cause the at least one processor to: select, from a plurality of vehicles, based on an amount of elapsed time since each respective vehicle of the plurality of vehicles has performed a road friction probing maneuver, a vehicle to perform the road friction probing maneuver within a road segment of a roadway; and responsive to selecting the vehicle, output, to the vehicle, a command causing the vehicle to perform the road friction probing maneuver within the road segment.

In another example, a device includes means for selecting, from a plurality of vehicles, based on an amount of elapsed time since each respective vehicle of the plurality of vehicles has performed a road friction probing maneuver, a vehicle to perform the road friction probing maneuver within a road segment of a roadway. The device further includes means for responsive to selecting the vehicle, outputting, to the vehicle, a command causing the vehicle to perform the road friction probing maneuver within the road segment.

In another example, a method includes selecting, from a plurality of vehicles, based on an amount of elapsed time since each respective vehicle of the plurality of vehicles has performed a road friction probing maneuver, a vehicle to perform the road friction probing maneuver within a road segment of a roadway. The method also includes responsive to selecting the vehicle, outputting, to the vehicle, a command causing the vehicle to perform the road friction probing maneuver within the road segment.

In another example, a computer-readable storage medium includes instructions that, when executed by at least one processor of a computing system of a vehicle, cause the at least one processor to select, from a plurality of vehicles, based on an amount of elapsed time since each respective vehicle of the plurality of vehicles has performed a road friction probing maneuver, a vehicle to perform the road friction probing maneuver within a road segment of a roadway; and responsive to selecting the vehicle, output, to the vehicle, a command causing the vehicle to perform the road friction probing maneuver within the road segment.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
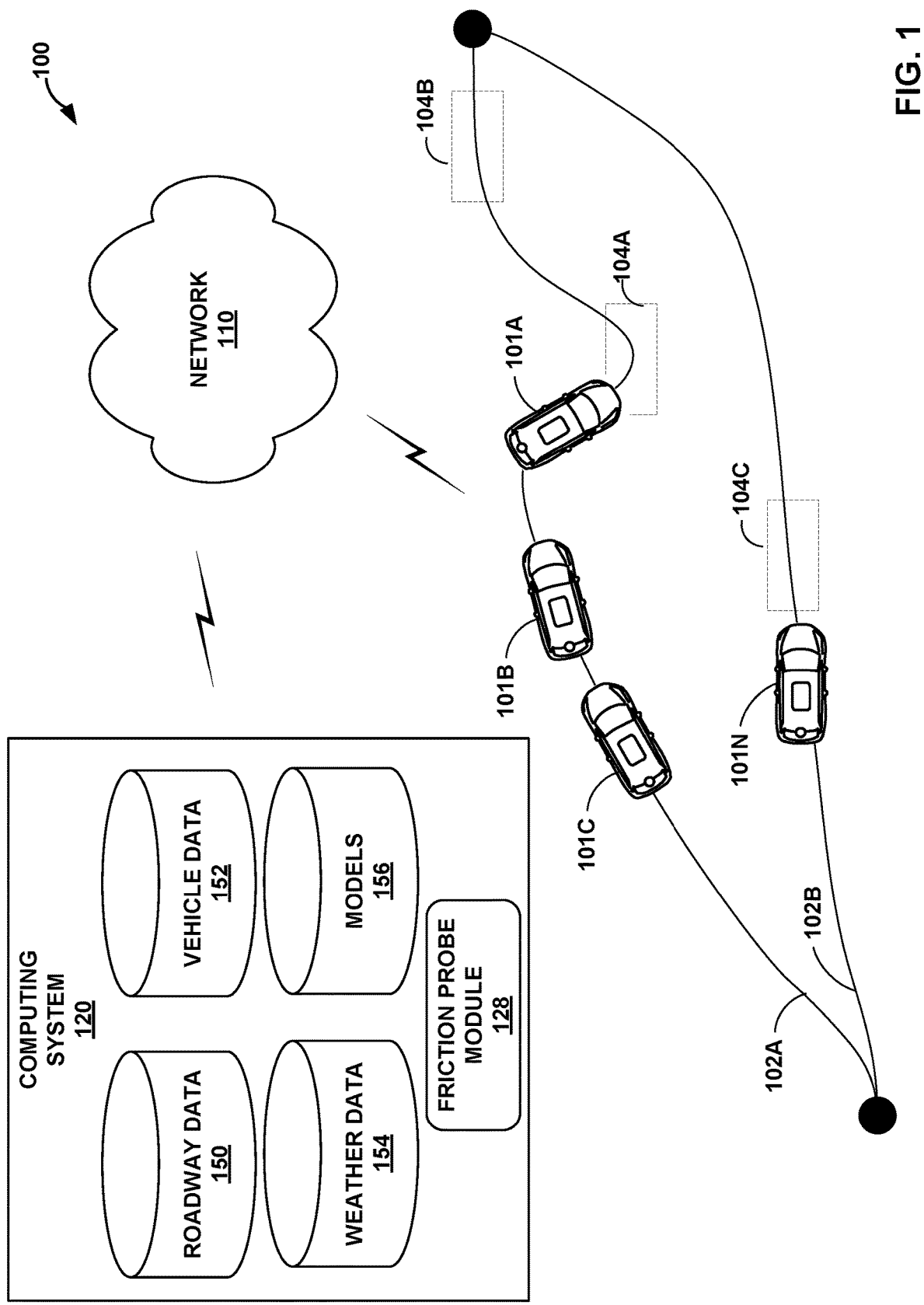
FIG. 1 is a diagram illustrating an example system configured to dynamically select vehicles to perform road friction probing maneuvers to estimate road friction, in accordance with one or more techniques of this disclosure.

FIG. 1 is a conceptual block diagram illustrating an example system configured to dynamically select vehicles to perform road friction probing maneuvers to estimate road friction, in accordance with one or more techniques of this disclosure. As shown in the example of FIG. 1, system 100 includes a plurality of vehicles 101A-101N (collectively, vehicles 101), a network 110, and a computing system 120.

Vehicles 101 may include any type of autonomous, semi-autonomous, or non-autonomous vehicles. Although shown as automobiles in the example of FIG. 1, vehicles 101 may represent any type of vehicle, including a car, a truck, a bus, a recreational vehicle (RVs), a tractor, an all-terrain vehicle (ATV), or any other type of vehicle. Vehicles 101 may navigate roadways 102A and 102B (collectively, roadways 102).

In the example of FIG. 1, a first subset of vehicles 101 (e.g., vehicles 101A, 101B, and 101C) traverse roadway 102A and a second subset of vehicles 101 (e.g., vehicle 101N) traverse roadway 102B. In one example, each roadway 102 may be logically divided into a plurality of road segments. As used herein, a road segment refers to a section or portion of a roadway defined by a pre-determined length, such as 50 meters, 100 meters, 500 meters, 1 kilometer, 5 kilometers, etc. In some scenarios, roadways 102 may be tens, hundreds, or thousands of kilometers long, and may be logically divided into tens, hundreds, or even thousands of road segments. As illustrated in FIG. 1, roadway 102A may include road segments 104A and 104B and roadway 102B may include road segment 104C.

Vehicles 101 may be communicatively coupled to one another and/or to computing system 120 via network 110. Network 110 may represent any type of network by which communication between vehicles 101 and computing system 120 may be accomplished.

Network 110 may represent a public network (e.g., the Internet), a private network, a cellular network (including various cellular data network, such as a 3G, 4G and/or 5G network), a personal area network, or combinations thereof.

Computing system 120 may represent one or more devices configured to communicate via network 110 with vehicles 101. Examples of computing system 120 include, but are not limited to, servers, distributed computing systems (e.g., cloud-based computing systems), desktop computers, laptop computers, etc. Computing system 120 may communicate via network 110 with vehicles 101 to monitor or otherwise retrieve data from one or more components of vehicle 101, such as a navigation system, an infotainment system, an anti-lock braking system (ABS), a traction control (TC) system, an electronic stability control (ESC) system, a friction probing system, or any other component or system integrated into vehicles 101 or in communication with vehicles 101. Computing system 120 may, in addition or as an alternative to monitoring vehicles 101, communicate with vehicles 101 to update one or more of the above noted components of vehicles 101.

Computing system 120 may include friction probe module 128, roadway data 150, vehicle data 152, and weather data 154. Module 128 may perform operations described using hardware, hardware and firmware, hardware and software, or a mixture of hardware, software, and firmware residing in and/or executing at computing system 120. Computing system 120 may execute module 128 with multiple processors or multiple devices. Computing system may execute module 128 as virtual machines executing on underlying hardware. Module 128 may execute as one or more services of an operating system or computing platform. Module 128 may execute as one or more executable programs at an application layer of a computing platform.

In some examples, roadway data 150 includes road friction data indicative of the estimated road friction for each of roadways 102. In one example, the road friction data includes a coefficient of friction between a surface of a road segment and the tires of a vehicle for each road segment 104. For example, roadway data 150 may include a friction map that indicates the co-efficient of friction within each of road segments 104. The road friction data may include historical estimated road friction data. For example, the road friction data may include the estimated road friction and a corresponding timestamp for each estimate of the road friction.

In some instances, roadway data 150 includes traffic data indicative of traffic levels for each roadway or road segment, such as a volume or number of vehicles 101 traveling through each road segment 104, density of vehicles in each road segment 104, speeds (e.g., average speeds) in each road segment 104, etc. In another instance, for each roadway 102 or road segment 104, roadway data 150 includes data indicative of a road material (e.g., gravel, concrete, asphalt, etc.), a road type (e.g., alley, boulevard, highway, freeway, etc.), and/or road surface quality (e.g., smooth, rough, etc.). In one instance, roadway data 150 includes data indicating the physical road features of each roadway 102 or road segment 104, such whether a road segment 104 includes a bridge, an underpass, a curve, a straight-away, etc. In yet another instance, roadway data 150 includes data indicating administrative features of a roadway 102 or road segment 104, such accident or collision data, speed limit data, construction zone data (e.g., whether a roadway 102 or road segment 104 includes one or more construction zones), among others.

In accordance with techniques of this disclosure, friction probe module 128 dynamically selects one or more road segments 104 of roadways 102 at which to perform a road friction probing maneuver. In other words, friction probe module 128 may determine which regions or segments of roadways 102 should be tested in order to estimate the road friction within the respective road segments 104.

Friction probe module 128 may select one or more road segments 104 based on roadway data 150, vehicle data 152, and/or weather data 154. For example, friction probe module 128 may determine, based on the road friction data within roadway data 150, an amount of elapsed time since the road friction was last estimated for each road segment 104. Friction probe module 128 may compare the amount of elapsed time to a threshold amount of time (e.g., 12 hours, 2 days, 1 week, etc.). In one example, friction probe module 128 may determine to probe the road friction within a road segment in response to determining that the amount of elapsed time since probing the road friction within that road segment satisfies (e.g., is greater than or equal to) the threshold amount of time. For example, friction probe module 128 may determine that the road friction of road segment 104C was probed within the threshold amount of time of the current time, such that friction probe module 128 may refrain from causing a vehicle to perform road friction probing maneuvers within road segment 104C.

Friction probe module 128 may select one or more roadway segments 104 based at least in part on the current time of day. For example, road friction may change depending on the time of day (e.g., despite consistent weather conditions at different times of day). For example, the air temperature may be a given temperature at two different times of day and the road friction may be different depending on whether the roadway or road segment is heating or cooling. In one instance, friction probe module 128 may determine, based on the road friction data, the amount of time since the road friction was last estimated for one or more road segments 104 at that time of day. For instance, when the current time of day is early-evening (e.g., 7 pm), friction probe module 128 may determine that the amount of elapsed time since a given road segment was probed at a similar time of day was 3 days ago. In such instances, friction probe module 128 may determine to probe the road friction of roadway segment 104A within a period of time (e.g., early evening, such as 6-9 pm), for example, even if segment 104A was probed recently (e.g., at 10 am of the current day). By probing the road friction at different times of day, friction probe module 128 may select a roadway segment for probing maneuvers even if the current weather (e.g., air temperature, presence of precipitation, etc.) is the same or similar as the weather when previously performing a probing maneuver.

In another example, friction probe module 128 may select one or more road segments 104 for probing the road friction based on weather data 154. For example, weather data 154 may include temperature data (e.g., air temperature and/or ground temperature), precipitation data (e.g., type of precipitation, such as rain or snow; amount of precipitation; time of the precipitation (e.g., starting and/or ending time), or a combination thereof, for each roadway 102 or road segment 104. In one example, friction probe module 128 may determine to probe the road friction of road segments 104A and 104B in response to determining that precipitation has started or stopped or that the air temperature has crossed a threshold air temperature (e.g., 0 degrees Celsius or 32 degrees Fahrenheit).

Responsive to selecting road segments 104A and 104B for friction probing maneuvers, friction probe module 128 may rank or prioritize the selected road segments. In some examples, friction probe module 128 may rank the selected road segments based at least in part on roadway data 150, vehicle data 152, and/or weather data 154. For example, friction probe module 128 may rank road segments 104A and 104B based on the physical road features indicated by roadway data 150. In one scenario, friction probe module 128 may determine that road segment 104A includes a bridge and that road segment 104B includes a curve, and may rank road segment 104A higher than road segment 104B. In such scenarios, friction probe module 128 prioritizes road segment 104A for road friction probing maneuvers.

In one example, friction probe module 128 predicts one or more vehicles 101 that will traverse road segment 104A within a period of time (e.g., within a threshold amount of time from the current time, such as within the next half-hour; within a particular time frame, such as 5:00-5:30 PM; etc.). In some instances, friction probe module 128 predicts which of vehicles 101 will traverse road segment 104A based on vehicle data 152. Vehicle data 152 may include navigation data indicative of past, present, and/or future locations of each of vehicles 101. In some examples, a computing system (e.g., computing system 120 and/or a computing system on board vehicles 101) may present the vehicle owner, driver, or other user associated with a given vehicle opportunities to control access to such vehicle data 152, and may store or analyze vehicle data 152 only if the vehicle owner, driver, or other user authorizes the computing system to utilize such data. In one instance, friction probe module 128 determines that a plurality of vehicles (e.g., vehicles 101A-101C) will traverse road segment 104A.

Responsive to predicting that vehicles 101A-101C will traverse road segment 104A, friction probe module 128 determines whether one or more of vehicles 101A-101C are eligible to perform road friction probing maneuvers within road segment 104A within the period of time. Friction probe module 128 may determine which of vehicles 101A-101C are eligible to perform the road friction probing maneuvers based on vehicle data 152. In one instance, vehicle data 152 includes historical probing maneuver data indicating when each of vehicles 101 has previously performed a road friction probing maneuver. In another instance, vehicle data 152 includes probing maneuver preference data for each of vehicles 101 and/or the respective drivers of vehicles 101. The probing maneuver preference data may include data indicating, for each of vehicles 101, a threshold amount of time between probing maneuvers (e.g., once per week, once per month, etc.); days, times, or locations at which probing maneuvers are permitted and/or prohibited; whether probing maneuvers are permitted and/or prohibited for different numbers or types of passengers (e.g., probing maneuvers are permitted when the driver is the only passenger and are prohibited if there are other passengers); etc.

In some scenarios, friction probe module 128 determines that vehicles 101A and 101B are eligible to perform road friction probing maneuvers based on vehicle data 152. For instance, friction probe module 128 may determine that vehicle 101C has performed a probing maneuver within the threshold amount of time between probing maneuvers for vehicle 101C such that vehicle 101C is not eligible to perform road friction probing maneuvers. In another instance, road friction probe module 128 may determine that vehicles 101A and 101B are eligible to probe the road friction within road segment 104A because vehicles 101A and 101B have not performed a road friction probing maneuver within a threshold amount of time between probing maneuvers.

Friction probe module 128 may select one of eligible vehicles 101A and 101B to perform a road friction probing maneuver based on vehicle data 152. Friction probe module 128 may select one of vehicles 101A and 101B only if the respective owner or driver has affirmatively authorized friction probe module 128 to collect or analyze data from vehicles 101A and 101B, respectively. In one example, friction probe module 128 may determine when each eligible vehicle most recently performed a probing maneuver. Friction probe module 128 may select vehicle 101A as the vehicle to perform the road friction probing maneuver within road segment 104A in response to determining that the amount of time since vehicle 101A has performed a probing maneuver is greater than the amount of time since vehicle 101B has performed a probing maneuver. In other words, friction probe module 128 may select vehicle 101A in response to determining that vehicle 101A has gone the longest amount of time since performing a road friction probing maneuver.

Responsive to selecting vehicle 101A for performing road friction probing maneuvers within road segment 104A, friction probe module 128 may predict a set of vehicles that will traverse road segment 104B. In one example, friction probe module 128 determines that vehicles 101A-101C will traverse road segment 104C, as described above. Friction probe module 128 may determine whether any of vehicles 101A-101C are eligible to perform road friction probing maneuvers within road segment 104B, in a similar manner as described above. In some instances, friction probe module 128 determines that vehicles 101A and 101C are ineligible, but that vehicle 101B is eligible. In such instances, friction probe module 128 selects vehicle 101B to perform a road friction probing maneuver within road segment 104B.

Friction probe module 128 may cause one or more vehicles 101 to perform a road friction probing maneuver in response to selecting one or more vehicles 101 for performing the road friction probing maneuvers. In some instances, friction probe module 128 transmits a command to each of vehicles 101A and 101B to cause vehicles 101A and 101B to perform the road friction probing maneuvers within road segments 104A and 104B, respectively.

Vehicles 101A and 101B may receive the command and may perform a road friction probing maneuver when vehicles 101A and 101B are located within road segments 104A and 104B, respectively. In some scenarios, a vehicle, such as vehicle 101A, excites one or more tires of vehicle 101 to perform the road friction probing maneuver. For example, vehicle 101 may perform road friction probing maneuvers by adjusting operation of a propulsion, braking, and/or steering component of the vehicle. For example, vehicle 101A may perform the road friction probing maneuver by decreasing the rotational speed of one or more wheels (e.g., one or both of the front wheels) while increasing the rotational speed of one or more other wheels (e.g., one or both of the back wheels). In other words, vehicle 101A may perform the road friction probing maneuver by slowing a first tire of vehicle 101A and simultaneously accelerating a second tire of vehicle 101A. As one example, vehicle 101A may brake a rear axle (or a single rear wheel) via a friction or regenerative braking and propel a front axle (or single front wheel) via an internal combustion engine or electric motor.

Responsive to performing a road friction probing maneuver, vehicle 101A may transmit data indicative of the road friction to computing system 120. In some instances, the data indicative of the road friction may include sensor data generated by sensors of vehicle 101A. In one instance, the sensor data includes data indicative of characteristics of vehicle 101A, such as motion data generated by one or more motion sensors (e.g., an inertial measuring unit (IMU)), wheel speed data generated by one or more wheel speed sensors, among others. In another instance, the sensor data includes data indicative of characteristics of the environment, such as one or more temperature sensors, radar sensors, etc.

Vehicle 101A may transmit all or a portion of the sensor data to computing system 120, such that friction probe module 128 may estimate the road friction within road segment 104A. Additionally or alternative, vehicle 101A may determine or estimate the road friction within road segment 104A. In such examples, the data indicative of the road friction may include an estimated road friction value.

Computing system 120 and/or a computing device of vehicle 101A may determine or estimate the road friction of road segment 104A based on the sensor data and one or more models 156. Models 156 may be pre-programmed or may be trained using machine learning. In one example, computing system 120 applies models 156 to the sensor data to estimate the road friction. In other words, models 156 may receive sensor data as inputs and may output data indicative of the road friction (e.g., an estimated co-efficient of friction between the surface of the road segment and the tires of vehicle 101A).

Responsive to estimating the road friction of road segment 104B, computing system 120 updates the road friction data of roadway data 150, for example, by updating a friction map. In some examples, computing system 120 outputs the road friction data of roadway data 150 for various road segments 104 to vehicles 101. In another example, computing system 120 computes a following distance and/or a stopping distance for one or more vehicles 101 based on the road friction data. In some instances, computing system 120 may suggest navigation routes based on the road friction data of roadway data 150. For instance, computing system 120 may determine that roadway 102A has higher friction than roadway 102B and may suggest routes that traverse roadway 102A to one or more vehicles 101. In other words, computing system 120 may determine that the co-efficient of friction between roadway 102A and the tires of a vehicle is greater than the co-efficient of friction between roadway 102B and the tires of a vehicle.

Vehicles 101 may receive all or a portion of the road friction data of roadway data 150. In some examples, vehicles 101 adjust operation of vehicles 101 based on the road friction data. For example, vehicles 101B and 101C may automatically adjust (e.g., decrease) their speed or output a notification suggesting a different (e.g., lower) speed based on the road friction data 150 when traversing road segment 104A. In another example, vehicles 101B and 101C may automatically adjust (e.g., increase) a following distance or output a notification suggesting a different (e.g., increased) following distance when traversing road segment 104A based on the road friction data.

Figure 2:
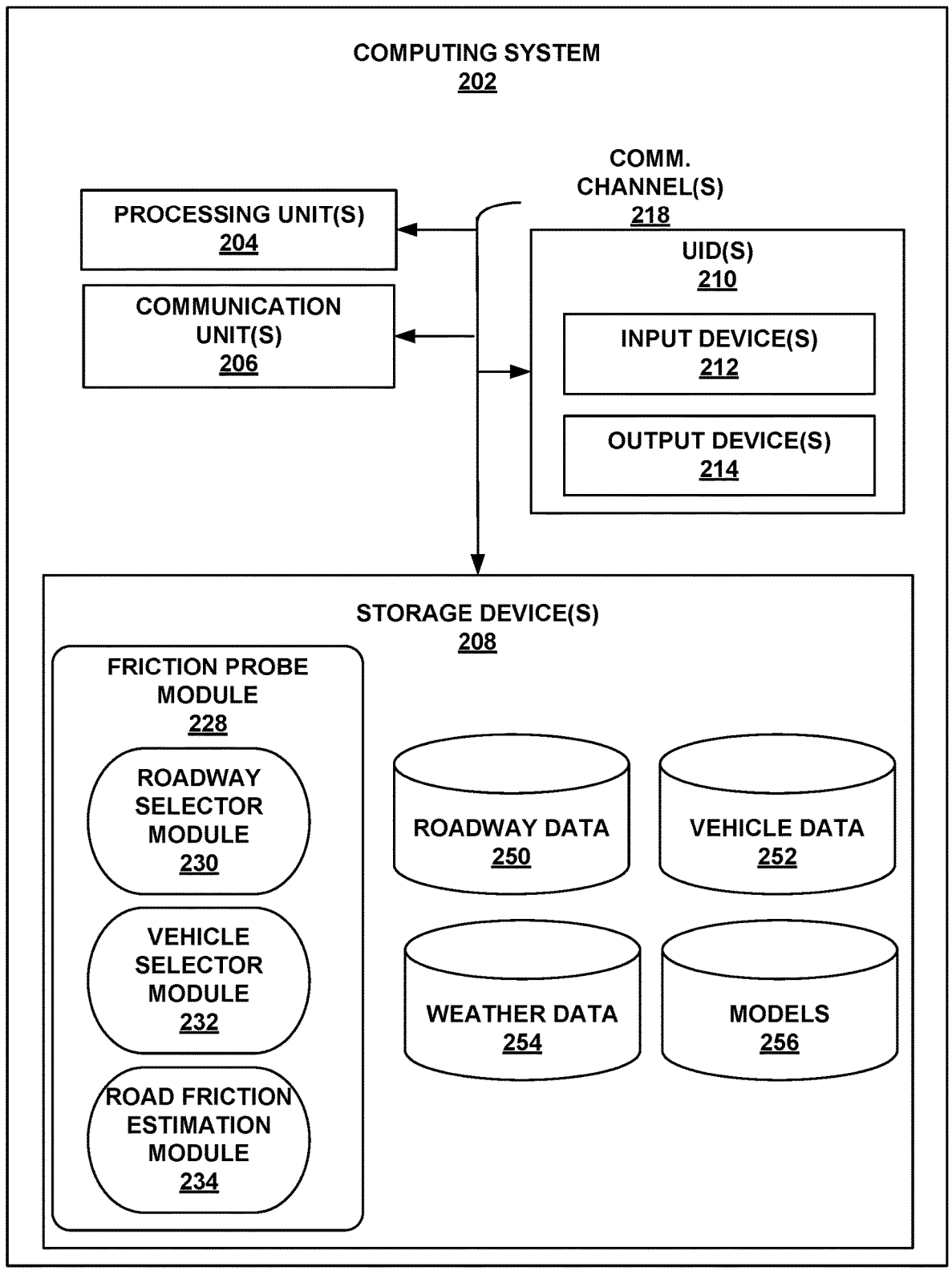
FIG. 2 is a block diagram illustrating an example computing system configured to dynamically select vehicles to perform road friction probing maneuvers to estimate road friction, in accordance with one or more techniques of this disclosure.

FIG. 2 is a block diagram illustrating an example computing system configured to dynamically select vehicles to perform road friction probing maneuvers to estimate road friction, in accordance with one or more techniques of this disclosure. Computing system 202 represents an example of computing system 120 described above with reference to FIG. 1. Computing system 202 may be an example of computing system 120 of FIG. 1. As illustrated in FIG. 2, computing system 202 includes at least one processing unit 204, at least one communication unit 206, at least one storage device 208, at least one user interface device (UID) 210, and at least one communication channel 218. FIG. 2 illustrates only one particular example of computing system 202, and many other examples of computing system 202 may be used in other instances and may include a subset of the components included in example computing system 202 or may include additional components not shown in FIG. 2.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing systems by transmitting and/or receiving data. Communications units 206 may include wired and/or wireless communication units. Examples of wired communication units 206 include Universal Serial Bus (USB) transceivers and Ethernet transceivers, among others. Examples of wireless communication units 206 include GPS radios, cellular (e.g., LTE) radios, Bluetooth™ radios, WiFi™ radios, or any other wireless radios.

In some examples, storage device 208 may represent a unit configure to store one or more modules, such as friction probe module 228. Storage device 208 may be a temporary memory, meaning that a primary purpose of storage device 208 is not long-term storage. Storage device 208 may be configured for short-term storage of data as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of data than typically stored by volatile memory. Storage device 208 may further be configured for long-term storage of data as non-volatile memory space and retain data after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or data (e.g., data) that, when executed, cause processing unit 204 to perform the techniques of this disclosure. For example, storage device 208 may include data or data associated with module 228 and one or more data stores, such as roadway data 250, vehicle data 252, weather data 254, and models 256. Roadway data 250, vehicle data 252, weather data 254 and models 256 may be examples of roadway data 150, vehicle data 152, weather data 154, and models 156 of FIG. 1, respectively.

User interface devices (UID) 210 may represent a unit configured to enable a user to interact with computing system 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display data to a user.

Communication channels 218 may represent a unit configured to interconnect each of components 204, 206, 208, and/or 210 for inter-component communications (physically, communicatively, and/or operatively). In some examples, communication channels 218 may include a system bus, a network connection, one or more inter-process communication data structures, or any other components for communicating data.

As further shown in the example of FIG. 2, storage device 208 stores friction probe module 228, which includes roadway selector module 230, vehicle selector module 232, and road friction estimation module 234. Processing units 204 may interface with storage device 208 to retrieve one or more instructions modules 228, 230, 232, and 234 that, when executed, cause processing units 204 to perform operations associated with modules 228, 230, 232, and 234. Reference to modules 228, 230, 232, and 234 performing various operations should be understood to refer to processing units 204 performing the various operations discussed with respect to each of modules 228, 230, 232, and 234.

Roadway selector module 230 may select one or more road segments 104 of FIG. 1 for which to estimate the road friction. Roadway selector module 230 may select one or more road segments 104 based on roadway data 250, vehicle data 252, and/or weather data 254. In one example, roadway data 250 may include road friction data, such as data indicating when the road friction of each segment of roadway was last estimated. In such examples, roadway selector module 230 may select a road segment based on an amount of elapsed time since the road friction was last estimated for the road segment, as described above with reference to FIG. 1.

In some examples, roadway selector module 230 may determine one or more road segments 104 to estimate the road friction based on traffic data stored within roadway data 250. As one example, roadway selector module 230 may select road segment 104A in response to determining that the volume of traffic or density of traffic traversing road segment 104A satisfies (e.g., is greater than or equal to) a first threshold traffic level. For example, the road friction may change as the density of traffic increases (e.g., the surface may become hotter with more traffic, which may change the friction between the road surface and the tires of vehicles 101). In another example, roadway selector module 230 may refrain from selecting (e.g., determine not to select) road segment 104C in response to determining that the volume or density of traffic satisfies a different threshold (e.g., that is larger than the first threshold) traffic level. For example, when the traffic levels are greater than the different threshold traffic level, roadway selector module 230 may determine that vehicles 101 within road segment 104C are too close to one another and may temporarily refrain from selecting road segment 104C for estimating the road friction. That is, in some instances, roadway selector module 230 may select a road segment in response to determining that the traffic level of the road segment satisfies (e.g., is greater than or equal to) a first traffic threshold and does not satisfy (e.g., is less than) a second traffic threshold.

Vehicle selector module 232 may predict one or more vehicles 101 that will traverse road segment 104A within a period of time (e.g., within a threshold amount of time from the current time, such as within the next half-hour; within a particular time frame, such as 5:00-5:30 PM; etc.). Vehicle selector module 232 may predict which of vehicles 101 will traverse road segment 104A based on vehicle data 252. In some examples, computing system 202 presents the vehicle owner, driver, or other user associated with each respective vehicle 101 with opportunities to control access to such vehicle data 252, and stores or analyzes vehicle data 252 only if the vehicle owner, driver, or other user authorizes computing system 202 to utilize such data. In one example, vehicle data 252 includes navigation data indicative of past, present, and/or future locations of each of vehicles 101, such as data indicating a destination of each of vehicles 101 (e.g., a destination programmed into a navigation application). Vehicle selector module 232 may predict that vehicles 101A-101C will traverse road segment 104A in response to determining that the shortest route to each respective destination includes traversing road segment 104A.

Vehicle selector module 232 determines whether any of vehicles 101A-101C are eligible to perform road friction probing maneuvers within road segment 104A based at least in part on vehicle data 252. In one instance, vehicle data 252 includes historical probing maneuver data indicating when each of vehicles 101 has previously performed a road friction probing maneuver. In another instance, vehicle data 252 includes probing maneuver preference data for each of vehicles 101 and/or the respective drivers of vehicles 101. The probing maneuver preference data may include data indicating, for each of vehicles 101, a threshold or minimum amount of time between probing maneuvers (e.g., once per week, once per month, etc.); days, times, or locations at which probing maneuvers are permitted and/or prohibited; whether probing maneuvers are permitted and/or prohibited for different numbers or types of passengers; etc.

Vehicle selector module 232 determines, in one example, that vehicles 101A and 101B are eligible to perform road friction probing maneuvers based on vehicle data 252. For instance, vehicle selector module 232 may determine, from the plurality of vehicles predicted to traverse road segment 104A, a subset of vehicles that have not performed a road friction probing maneuver within a threshold amount of time. In one instance, vehicle selector module 232 may determine that vehicles 101A and 101B are eligible to probe the road friction within road segment 104A in response to determining the drivers of vehicles 101A and 101B have given permission to perform probing maneuvers and that the amount of time since each of vehicles 101A and 101B have performed a probing maneuver is at least the minimum or threshold amount of time. In another instance, vehicle selector module 232 may determine that vehicle 101C is not eligible to perform road friction probing maneuvers in response to determining probing maneuver preference data for the driver of vehicle 101C indicates driver 101C has not given permission to perform road friction probing maneuvers.

Vehicle selector module 232 may select one of eligible vehicles 101A and 101B to perform a road friction probing maneuver. In one example, vehicle selector module 232 may randomly select one of the eligible vehicles to perform the road friction probing maneuver. In another example, vehicle selector module 232 selects a vehicle based on vehicle data 252. For example, vehicle selector module 232 may select the vehicle having the longest amount of elapsed time since performing a road friction probing maneuver. In other words, vehicles selector module 232 may select the vehicle that has gone the longest since performing a road friction probing maneuver. As one example, vehicle selector module 232 may select vehicle 101A as the vehicle to perform the road friction probing maneuver within road segment 104A in response to determining that the amount of time since vehicle 101A has performed a probing maneuver is greater than the amount of time since vehicle 101B has performed a probing maneuver.

In some scenarios, vehicle selector module 232 selects a plurality of vehicles to perform road friction probing maneuvers within different subsegments of a single road segment. In one scenario, when road segment 104A includes a bridge, vehicle selector module 232 may select vehicle 101A to probe the road friction in a subsegment where the road surface of segment 104A transitions from being at ground level to above ground level (or vice versa), and may select vehicle 101B to probe the road friction in a subsegment where the road surface is entirely above ground level. In another scenario, when a length of road segment 104A satisfies (e.g., is greater than or equal to) a threshold length, vehicle selector module 232 may logically divide road segment 104A into a plurality of subsegments, and may select a vehicle to probe the friction within each of the subsegments. Each subsegment may be the same length (e.g., 100 meters, 500 meters, etc.). In one instance, at least one subsegment is a different length relative to at least one other subsegment. By selecting a plurality of vehicles to probe a plurality of subsegments of the same roadway segment 104A, vehicle selector module 232 enable road friction estimation module 234 to estimate road friction at different locations within the same segment of roadway, which may provide more granular friction estimates and improve driving safety within those segments.

Vehicle selector module 232 may cause one or more vehicles 101 to perform a road friction probing maneuver in response to selecting one or more vehicles 101 for performing the road friction probing maneuvers. In some instances, vehicle selector module 232 transmits a command to each of vehicles 101A and 101B to cause vehicles 101A and 101B to perform the road friction probing maneuvers within road segment 104A or within subsegments of road segment 104A. The command may indicate the location of segment 104A (or the location of a subsegment). For example, each command may indicate GPS coordinates indicating the boundaries of the segment, or GPS coordinates at the center of the segment.

In some examples, vehicle selector module 232 outputs a notification to the selected vehicles 101 indicating that the vehicle will perform the road friction probing maneuver. For example, vehicle selector module 232 may output the notification to vehicle 101A prior to outputting the command to inform the driver that vehicle 101A will perform the road friction probing maneuver. In one example, the notification indicates the road segment 104A in which vehicle 101A will perform the road friction probing maneuver, such that vehicle 101A may output an alert to the driver prior to performing the road friction probing maneuver.

According to some examples, vehicles 101A performs a road friction probing maneuver when vehicles 101A is located within road segment 104A. Vehicle 101A may transmit data indicative of the road friction to computing system 202 in response to performing the road friction probing maneuver.

Road friction estimation module 234 may receive data indicative of the road friction from vehicle 101A after vehicle 101A performs the road friction probing maneuvers. In one example, the data indicative of the road friction includes sensor data generated by sensors of vehicle 101A, such as motion data generated by one or more motion sensors (e.g., an inertial measuring unit (IMU)) or wheel speed data generated by one or more wheel speed sensors, among others. In another example, the data indicative of the road friction may include the estimated road friction (e.g., the estimated co-efficient of friction between the surface of road segment 104A and the tires of vehicle 101A).

Road friction estimation module 234 may determine or estimate the road friction of road segment 104A based on the sensor data and one or more models 256. Models 256 may be pre-programmed or may be trained using machine learning. Examples of machine learning models include nearest neighbor, naïve Bayes, decision trees, linear regression, support vector machines, neural networks, k-Means clustering, Q-learning, temporal difference, deep adversarial networks, evolutionary algorithms, or other models trained using supervised, unsupervised, semi-supervised, or reinforcement learning algorithms, or combinations of any of the foregoing. Road friction estimation module 234 applies, in some examples, models 256 to the sensor data to estimate the road friction. In other words, models 256 may receive sensor data as inputs and may output data indicative of the road friction (e.g., an estimated co-efficient of friction between the surface of the road segment and the tires of vehicle 101A).

Responsive to estimating the road friction of road segment 104B, road friction estimation module 234 may update the road friction data of roadway data 250. For example, road friction estimation module 234 may update a road friction map. In some examples, road friction estimation module 234 outputs the estimated road friction to one or more vehicles 101, for example, by outputting all or part of the road friction map to vehicles 101. Road friction estimation module 234 may compute a following distance and/or a stopping distance for one or more vehicles 101 based on the road friction data and transmit the following distance or stopping distance to vehicles 101. In some instances, road friction estimation module 234 may determine a navigation route for one or more vehicles 101 based on the road friction data of roadway data 250 and may output data indicating the navigation route to one or more of vehicles 101.

Figure 3:
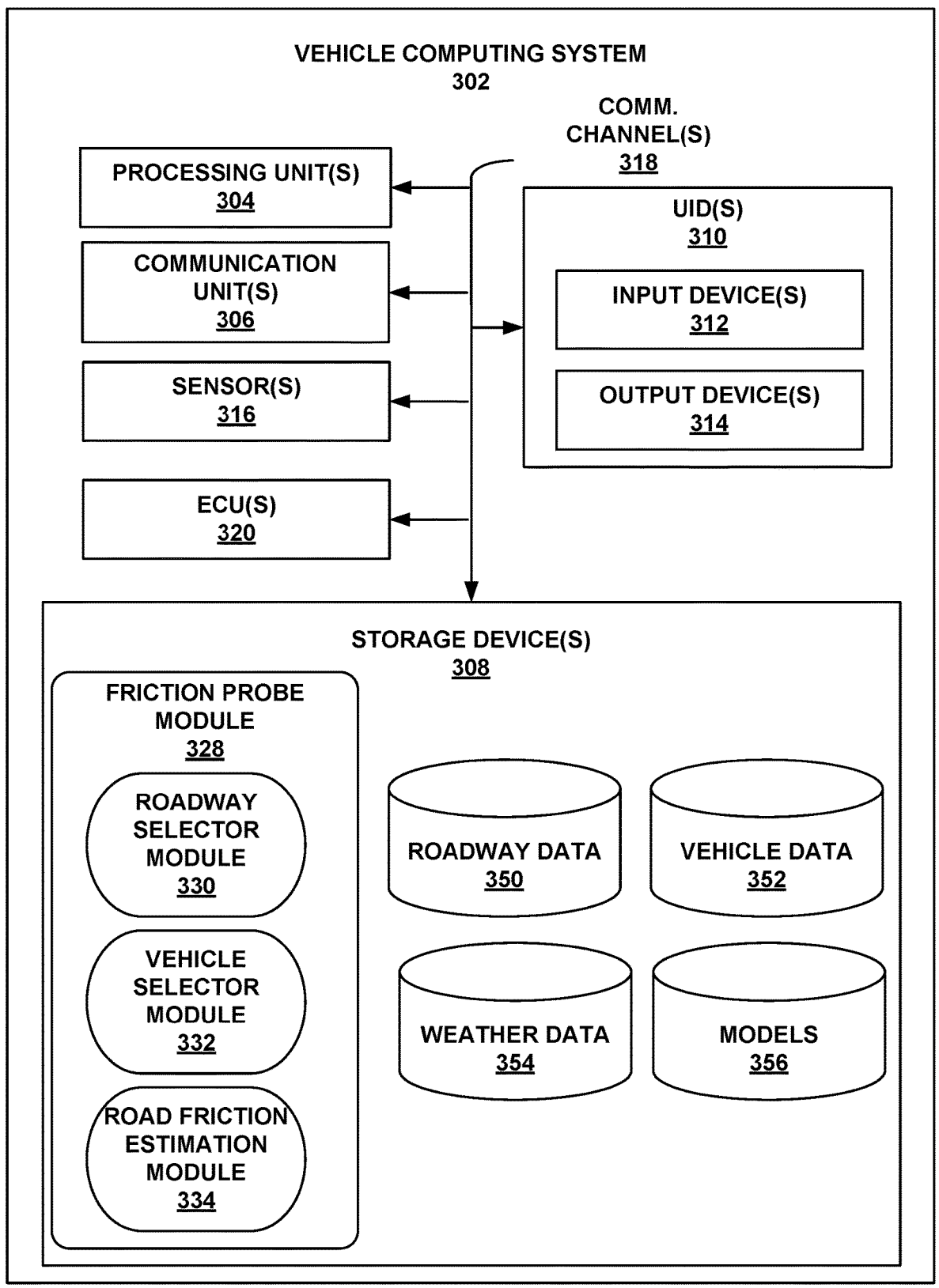
FIG. 3 is a conceptual diagram illustrating an example vehicle computing system configured to dynamically select vehicles to perform road friction probing maneuvers to estimate road friction, in accordance with one or more techniques of this disclosure.

FIG. 3 is a block diagram illustrating an example computing system configured to dynamically select vehicles to perform road friction probing maneuvers to estimate road friction, in accordance with one or more techniques of this disclosure. For ease of illustration, vehicle computing system 302 is described as included within vehicle 101A of FIG. 1. However, vehicle computing system 302 may be included within any vehicle 101.

As illustrated in FIG. 3, vehicle computing system 302 includes at least one processing unit 304, at least one communication unit 306, at least one storage device 308, at least one user interface device (UID) 310, at least one communication channel 318, and one or more ECUs 320. FIG. 3 illustrates only one particular example of vehicle computing system 302, and many other examples of vehicle computing system 302 may be used in other instances and may include a subset of the components included in example vehicle computing system 302 or may include additional components not shown in FIG. 3.

Processing units 304, communication units 306, storage devices 308, UIDs 310, input devices 312, output devices 314, and communication channels 318 may each be examples of processing units 204, communication units 206, storage devices 208, UIDs 210, input devices 212, output devices 214, and communication channels 218 of FIG. 2. Modules 328, 330, 332, and 334 may be examples of modules 228, 230, 232, and 234. Similarly, roadway data 350, vehicle data 352, weather data 354, and models 356 may be examples of roadway data 250, vehicle data 252, weather data 254, and models 256.

Sensors 316 may be configured to generate sensor data indicative of characteristics of vehicles 101 and/or characteristics of an environment in which vehicles 101 operate. Examples of sensors 316 include wheel speed sensors, motions sensors (e.g., inertial measurement units (IMUs), accelerometers, gyroscopes, etc.), temperature sensors, image sensors, radar sensors, LiDAR sensors, among others.

ECUs 320 may represent one or more electronic control units configured to control electronics and various subsystems of vehicle 101, as an anti-lock braking system or tracking control system. ECUs 320 may each be implemented as an embedded system, which may include a microcontroller or other type of processor, memory, inputs, and outputs as noted above. ECUs 320 may interface with one or more of sensors 316, for example by receiving data from sensors 316, to control or support various electronics and/or subsystems of vehicles 101. ECUs 320 may communicate with various components of vehicle computing system 302, such as sensors 316 and/or processing units 304 via one or more communication protocols, such as a controller area network (CAN) communication protocol, a FlexRay communication protocol, or any other communication protocol.

According to techniques of this disclosure, roadway selector module 330 may select one or more road segments 104 of FIG. 1 for which to estimate the road friction, in a manner similar to the manner described above with reference to FIGS. 1 and 2. In one example, vehicle computing system 302 receives roadway data 350 from another computing system, such as computing system 120 of FIG. 1 and determines whether to update the road friction data for any of the roadways along a route being traversed by vehicle 101A.

In one example, vehicle computing system 302 of vehicle 101A determines one or more nearby vehicles that will traverse a selected road segment based on data from nearby vehicles. For example, vehicle computing system 302 may communicate with nearby vehicles (e.g., vehicles 101B and 101C of FIG. 1) via communication units 306, such as a Dedicated Short Range Communications (DSRC) unit. In one example, vehicle computing system 302 requests vehicle data from nearby vehicles, such as navigation data (e.g., a destination) and probing maneuver preference data for each respective vehicle. In some scenarios, vehicle computing system 302 may receive roadway data, vehicle data, and/or weather data from another computing device, such as computing system 120 of FIG. 1. Vehicle selector module 332 may determine one or more vehicles 101 that will traverse road segment 104A within a period of time and determine whether any of the predicted vehicles are eligible to perform road friction probing maneuvers, in a manner similar to the techniques described above with reference to FIGS. 1 and 2.

Vehicle selector module 332 may select one of the eligible vehicles to perform a road friction probing maneuver. In one example, vehicle selector module 332 outputs a command to a different vehicle (e.g., vehicle 101B) via communication units 306 in response to selecting the different vehicle to perform the road friction probing maneuver.

In some instances, vehicle selector module 332 causes vehicle 101A to perform the road friction probing maneuver. In such instances, vehicle selector module 332 outputs a command to one or more ECUs 320 to cause vehicle 101A to perform the road friction probing maneuver. For instance, the command may cause ECUs 320 to adjust operation of a propulsion, braking, and/or steering component of vehicle 101A. In one instance, ECUs 320 cause vehicle 101A to perform the road friction probing maneuver by decreasing the rotational speed of one or more wheels (e.g., one or both of the front wheels) while increasing the rotational speed of one or more other wheels (e.g., one or both of the back wheels).

Vehicle selector module 332 may output an alert indicating that vehicle 101A will perform the road friction probing maneuver. In one example, vehicle computing system 302 of vehicle 101A receives a notification indicating that vehicle 101A has been selected to perform a road friction probing maneuver from another vehicle 101 or computing system 120 of FIG. 1. In such examples, vehicle selector module 332 may output the alert (e.g., via an output device 314, such as a display) in response to receiving the notification. In another example, vehicle selector module 332 may output the alert in response to vehicle selector module 332 selecting vehicle 101A to perform the road friction probing maneuver. In one example, the alert indicates the road segment 104A in which vehicle 101A will perform the road friction probing maneuver.

Sensors 316 may generate sensor data indicative of operating characteristics of one or more components of vehicle 101A during the road friction probing maneuver. For example, sensor data generated by sensors 316 may include motion data generated by one or more motion sensors (e.g., an inertial measuring unit (IMU)) or wheel speed data generated by one or more wheel speed sensors. In one example, vehicle computing system 302 transmits all or a portion of the sensor data generated by sensors 316 to another computing system, such as computing system 120 of FIG. 1, such that computing system 120 may estimate the road friction based on the sensor data.

In another example, road estimation module 334 of vehicle computing system 302 determines the road friction based on the sensor data generated by sensors 316. For example, road estimation module 334 may apply one or more models 356 to the sensor data to determine the road friction. In other words, models 356 may receive the sensor data as inputs and may output an estimated the co-efficient of friction between the surface of the roadway and the tires of vehicle 101A.

Responsive to estimating the road friction of road segment 104B, road friction estimation module 334 may update the road friction data of roadway data 350. For example, road friction estimation module 334 may update a friction map to indicate the estimated friction of segment 104A and the time of estimate. In some examples, road friction estimation module 334 transmits the estimated road friction to computing system 120 or other vehicles 101.

In some examples, road friction estimation module 334 may determine a following distance and/or a stopping distance based on the estimated road friction. As one example, road friction estimation module 334 may determine a preferred following distance for vehicle 101A based on the estimated road friction. In yet another example, road friction estimation module 334 may determine a navigation route (or update the route) based on the estimated road friction.

Figure 4:
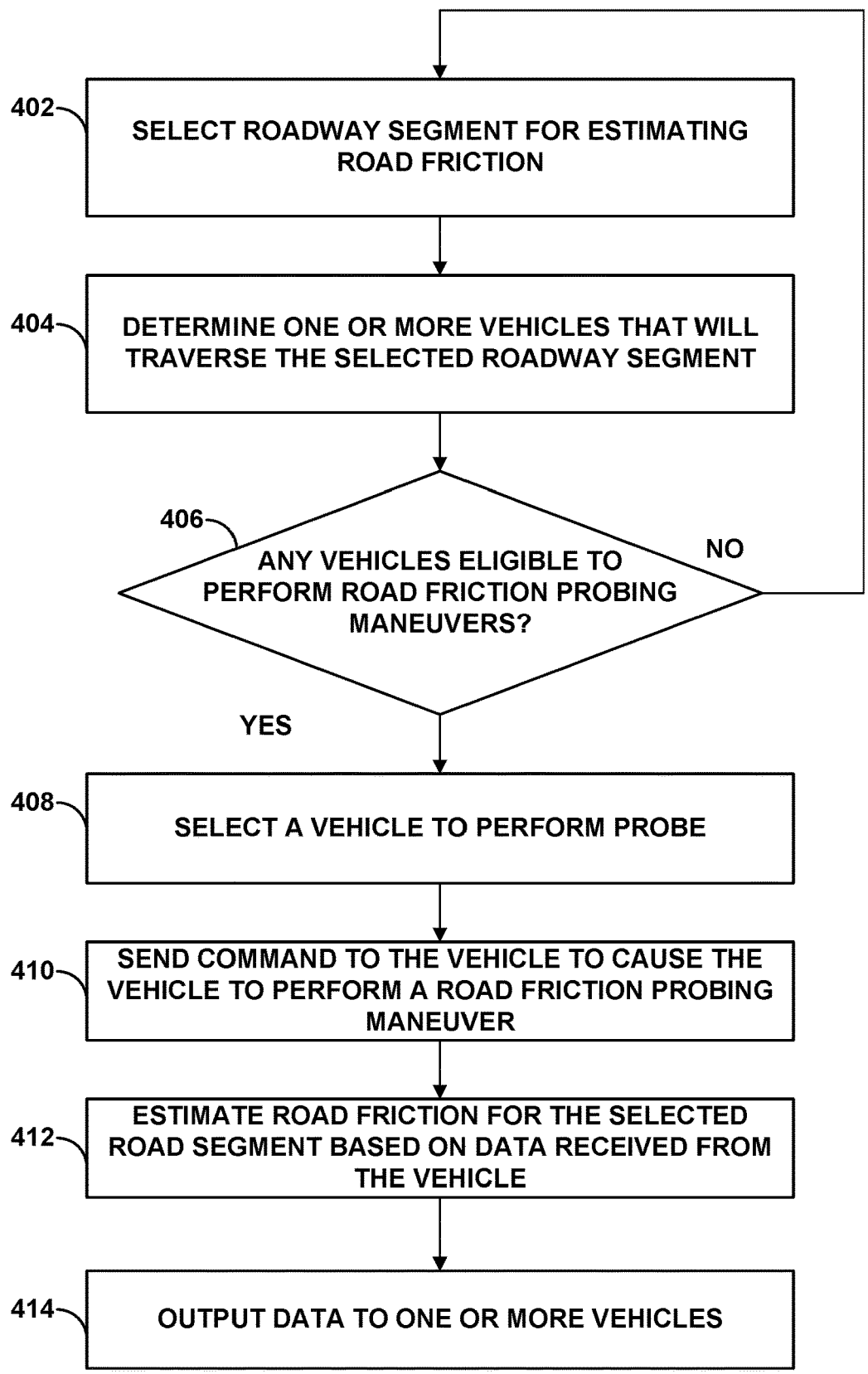
FIG. 4 is a flowchart illustrating an example technique for to dynamically selecting vehicles to perform road friction probing maneuvers to estimate road friction, in accordance with one or more techniques of this disclosure.

FIG. 4 is a flowchart illustrating an example technique for to dynamically selecting vehicles to perform road friction probing maneuvers to estimate road friction, in accordance with one or more techniques of this disclosure. For purposes of illustration only, FIG. 4 is described below within the context of system 100 of FIG. 1.

Friction probe module 128 of computing system 120 may select one or more road segments 104 for estimating the road friction between a surface of a road segment and tires of a vehicle (402). In some examples, friction probe module 128 selects one or more road segments 104 based on roadway data 150, vehicle data 152, and/or weather data 154. In one example, friction probe module 128 may determine to probe the road friction within a road segment in response to determining that the amount of elapsed time since probing the road friction within that road segment satisfies (e.g., is greater than or equal to) the threshold amount of time. In one example, friction probe module 128 may determine to probe the road friction of road segments 104A and 104B in response to determining that precipitation has started or stopped or that the temperature has crossed a threshold (e.g., 0 degrees Celsius or 32 degrees Fahrenheit).

In the example of FIG. 4, friction probe module 128 predicts one or more vehicles 101 that will traverse a selected road segment (e.g., road segment 104A) within a period of time (404). The period of time may be a threshold amount of time from the current time (e.g., within the next half-hour) or a particular time frame (e.g., 7:00-9:00 AM). Friction probe module 128 may predict vehicles that will traverse the selected road segment within the period of time based on vehicle data 152, such as previous, current, and/or future locations of vehicles 101.

Friction probe module 128 determines whether any of vehicles 101 are eligible to perform road friction probing maneuvers within selected road segment 104A (406). In one example, friction probe module 128 determines whether of any of vehicles 101 are eligible to perform the road friction probing maneuvers based on vehicle data 152, such as historical probing maneuver data and probing maneuver preference data for each of vehicles 101 and/or the respective drivers of vehicles 101. In one example, friction probe module 128 selects another roadway segment for estimating road friction in response to determining that none of the vehicle predicted to traverse selected road segment 104A are eligible to perform road friction probing maneuvers ("NO" branch of 406).

In one example, friction probe module 128 selects one or more eligible vehicles to perform road friction probing maneuvers within selected road segment 104A (408) in response to determining that at least one vehicle is eligible to perform road friction probing maneuvers ("YES" branch of 406). In one example, friction probe module 128 may selects the vehicle (e.g., vehicle 101A) that has gone the longest amount of time since performing a road friction probing maneuver.

Responsive to selecting vehicle 101A for performing road friction probing maneuvers within road segment 104A, friction probe module 128 sends a command to vehicle 101A to perform the road friction probing maneuvers within road segments 104A (410). In one example, the command indicates a location of selected road segment 104A.

Friction probe module 128 receives, in some examples, data indicative of the road friction within road segment 104A. In one example, the data indicative of the road friction includes an estimated road friction (e.g., an estimated co-efficient of friction). In another example, the data indicative of the road friction includes sensor data generated by one or more sensors of vehicle 101A.

Friction probe module 128 may estimate the road friction based on sensor data received from vehicle 101A (412). For example, friction probe module 128 may apply one or more models 156 to the sensor data to determine the road friction within road segment 104A. Models 156 may be pre-programmed or may be trained using machine learning.

In the example of FIG. 4, friction probe module 128 outputs data to one or more vehicles 101 in response to estimating the road friction within road segment 104A. In one example, friction probe module 128 sends a friction map to each of vehicles 101. In another example, friction probe module 128 outputs a suggested speed and/or suggested following distance based on the estimated road friction. In yet another example, friction probe module 128 outputs a navigation route that is based at least in part on the road friction.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The following numbered examples may illustrate one or more aspects of the disclosure:

Example 1. A method comprising: selecting, from a plurality of vehicles, based on an amount of elapsed time since each respective vehicle of the plurality of vehicles has performed a road friction probing maneuver, a vehicle to perform the road friction probing maneuver within a road segment of a roadway; and responsive to selecting the vehicle, outputting, to the vehicle, a command causing the vehicle to perform the road friction probing maneuver within the road segment.

Example 2. The method of example 1, further comprising: receiving data indicative of the road friction in response to the vehicle performing the road friction probing maneuver; estimating, based on the data indicative of the road friction, road friction between a tire of the vehicle and a surface of the roadway within the road segment; and outputting the estimate of the road friction within the road segment.

Example 3. The method of any one of examples 1-2, wherein the plurality of vehicles is a first plurality of vehicles, further comprising: predicting a second plurality of vehicles that will traverse the road segment; and determining a subset of the second plurality of vehicles that have not performed a road friction probing maneuver within a threshold amount of time; wherein the first plurality of vehicles includes the subset of the second plurality of vehicles.

Example 4. The method of any one of examples 1-3, wherein selecting the vehicle comprises selecting a vehicle having a longest amount of elapsed time since performing a road friction probing maneuver.

Example 5. The method of any one of examples 1-4, further comprising outputting, to a computing device associated with the vehicle, a notification indicating that the vehicle will perform the road friction probing maneuver.

Example 6. The method of any one of examples 1-5, wherein the command causes the vehicle to perform the road friction probing maneuver by at least causing a first tire of the vehicle to slow and simultaneously causing a second tire of the vehicle to accelerate.

Example 7. The method of any one of examples 1-6, wherein the vehicle is a first vehicle and the road friction probing maneuver is a first road friction probing maneuver, the method further comprising: selecting the first vehicle to perform the first road friction probing maneuver in a first subsegment of the road segment; and selecting a second vehicle to perform a second road friction probing maneuver in a second subsegment of the road segment.

Example 8. The method of any one of examples 1-7, further comprising: determining whether an amount of elapsed time since estimating the road friction for the road segment satisfies a threshold amount of time; and selecting the vehicle to perform the road friction probing maneuver within the road segment in response to determining that the amount of elapsed time since estimating the road friction for the road segment satisfies the threshold amount of time.

Example 9. The method of example 8, wherein the road segment is a first road segment, the method further comprising: determining that an amount of elapsed time since estimating road friction for a second road segment satisfies the threshold amount of time; ranking the first road segment and the second road segment based at least in part on one or more of a road material, a road type, a road surface quality, or a physical road feature of each of the first and second road segments; and selecting the vehicle to perform the road friction probing maneuver within the first road segment in response to ranking the first road segment higher than the second road segment.

Example 10. The method of any one of examples 1-9, further comprising: selecting the road segment for estimating road friction based at least in part on an amount of elapsed time since the road friction of the road segment was last estimated.

Example 11. The method of any one of examples 1-10, further comprising selecting the road segment for estimating road friction in response to determining an air temperature has crossed a threshold air temperature, that precipitation has started or stopped, or that a traffic level for the road segment satisfies a first threshold traffic level and does not satisfy a second threshold traffic level.

Example 12. A computing system comprising: at least one processor; a memory comprising instructions that, when executed, cause the at least one processor to: select, from a plurality of vehicles, based on an amount of elapsed time since each respective vehicle of the plurality of vehicles has performed a road friction probing maneuver, a vehicle to perform the road friction probing maneuver within a road segment of a roadway; and responsive to selecting the vehicle, output, to the vehicle, a command causing the vehicle to perform the road friction probing maneuver within the road segment.

Example 13. The computing system of example 12, further comprising means for performing the method of any one of examples 2-11.

Example 14. A computing system comprising means for performing the method of any one of examples 1-11.

Example 15. A computer-readable storage medium comprising instructions that, when executed by at least one processor of a computing system of a vehicle, cause the at least one processor to perform the method of any one of examples 1-11.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   at least one processor;
   a memory comprising instructions that, when executed, cause the at least one processor to:
   select, from a first plurality of vehicles, based on an amount of elapsed time since each respective vehicle of the plurality of vehicles has performed a road friction probing maneuver and a prediction that a second plurality of vehicles will traverse a road segment of a roadway, a vehicle to perform the road friction probing maneuver within the road segment, wherein the first plurality of vehicles includes a subset of the second plurality of vehicles that have not performed the road friction probing maneuver within a threshold amount of time; and
   responsive to selecting the vehicle, output, to the vehicle, a command causing the vehicle to perform the road friction probing maneuver within the road segment.

2. The computing system of claim 1, wherein executing the instructions further causes the at least one processor to:
   receive data indicative of the road friction in response to the vehicle performing the road friction probing maneuver;
   estimate, based on the data indicative of the road friction, road friction between a tire of the vehicle and a surface of the roadway within the road segment; and
   output the estimate of the road friction within the road segment.

3. The computing system of claim 1, wherein executing the instructions further causes the at least one processor to:
   responsive to receiving, from a vehicle computing system of the vehicle, sensor data indicative of a road friction of the road segment, update a friction map comprising a plurality of road segments.

4. The computing system of claim 1, wherein the vehicle is a vehicle having a longest amount of elapsed time since performing the road friction probing maneuver.

5. The computing system of claim 1, wherein executing the instructions further causes the at least one processor to output, to a computing device associated with the vehicle, a notification indicating that the vehicle will perform the road friction probing maneuver.

6. The computing system of claim 1, wherein the command causes the vehicle to perform the road friction probing maneuver by at least causing a first tire of the vehicle to slow and simultaneously causing a second tire of the vehicle to accelerate.

7. The computing system of claim 1, wherein the vehicle is a first vehicle and the road friction probing maneuver is a first road friction probing maneuver, and wherein executing the instructions further causes the at least one processor to:
   select the first vehicle to perform the first road friction probing maneuver in a first subsegment of the road segment; and
   select a second vehicle to perform a second road friction probing maneuver in a second subsegment of the road segment.

8. The computing system of claim 1, wherein executing the instructions further causes the at least one processor to:
   determine whether an amount of elapsed time since estimating a road friction for the road segment satisfies a threshold amount of time; and
   select the vehicle to perform the road friction probing maneuver within the road segment in response to determining that the amount of elapsed time since estimating the road friction for the road segment satisfies the threshold amount of time.

9. The computing system of claim 8, wherein the road segment is a first road segment, and wherein executing the instructions further causes the at least one processor to:
   determine that an amount of elapsed time since estimating road friction for a second road segment satisfies the threshold amount of time;
   rank the first road segment and the second road segment based at least in part on one or more of a road material, a road type, a road surface quality, or a physical road feature of each of the first and second road segments; and select the vehicle to perform the road friction probing maneuver within the first road segment in response to ranking the first road segment higher than the second road segment.

10. The computing system of claim 1, wherein executing the instructions further causes the at least one processor to select the road segment for estimating a road friction based at least in part on an amount of elapsed time since the road friction of the road segment was last estimated.

11. The computing system of claim 1, wherein executing the instructions further causes the at least one processor to select the road segment for estimating road friction in response to determining an air temperature has crossed a threshold air temperature or that precipitation has started or stopped.

12. The computing system of claim 1, wherein executing the instructions further causes the at least one processor to select the road segment for estimating road friction in response to determining that a traffic level for the road segment satisfies a first threshold traffic level and does not satisfy a second threshold traffic level.

13. A device comprising:
means for selecting, from a first plurality of vehicles, based on an amount of elapsed time since each respective vehicle of the first plurality of vehicles has performed a road friction probing maneuver and a prediction that a second plurality of vehicles will traverse a road segment of a roadway, a vehicle to perform the road friction probing maneuver within a road segment, wherein the first plurality of vehicles includes a subset of the second plurality of vehicles that have not performed the road friction probing maneuver within a threshold amount of time; and
means for responsive to selecting the vehicle, outputting, to the vehicle, a command causing the vehicle to perform the road friction probing maneuver within the road segment.

14. A method comprising:
selecting, from a first plurality of vehicles, based on an amount of elapsed time since each respective vehicle of the first plurality of vehicles has performed a road friction probing maneuver and a prediction that a second plurality of vehicles will traverse a road segment of a roadway, a vehicle to perform the road friction probing maneuver within a road segment, wherein the first plurality of vehicles includes a subset of the second plurality of vehicles that have not performed the road friction probing maneuver within a threshold amount of time; and
responsive to selecting the vehicle, outputting, to the vehicle, a command causing the vehicle to perform the road friction probing maneuver within the road segment.

15. The method of claim 14, further comprising:
receiving data indicative of a road friction in response to the vehicle performing the road friction probing maneuver;
estimating, based on the data indicative of the road friction, road friction between a tire of the vehicle and a surface of the roadway within the road segment; and
outputting the estimate of the road friction within the road segment.

16. The method of claim 14, wherein selecting the vehicle includes selecting a vehicle having a longest amount of elapsed time since performing the road friction probing maneuver.

17. The method of claim 14, wherein the vehicle is a first vehicle and the road friction probing maneuver is a first road friction probing maneuver, the method further comprising:
selecting the first vehicle to perform the first road friction probing maneuver in a first subsegment of the road segment; and
selecting a second vehicle to perform a second road friction probing maneuver in a second sub segment of the road segment.

18. The method of claim 14, further comprising:
determine whether an amount of elapsed time since estimating a road friction for the road segment satisfies a threshold amount of time; and
selecting the vehicle to perform the road friction probing maneuver within the road segment in response to determining that the amount of elapsed time since estimating the road friction for the road segment satisfies the threshold amount of time.

19. The method of claim 14, further comprising selecting the road segment for estimating road friction from a plurality of road segments in response to:
determining an air temperature has crossed a threshold air temperature;
determining that precipitation has started or stopped; or
determining that a traffic level for the road segment satisfies a first threshold traffic level and does not satisfy a second threshold traffic level.

20. A computer-readable storage medium comprising instructions that, when executed by at least one processor of a computing system of a vehicle, cause the at least one processor to:
select, from a first plurality of vehicles, based on an amount of elapsed time since each respective vehicle of the first plurality of vehicles has performed a road friction probing maneuver and a prediction that a second plurality of vehicles will traverse a road segment of a roadway, a vehicle to perform the road friction probing maneuver within a road segment, wherein the first plurality of vehicles includes a subset of the second plurality of vehicles that have not performed the road friction probing maneuver within a threshold amount of time; and
responsive to selecting the vehicle, output, to the vehicle, a command causing the vehicle to perform the road friction probing maneuver within the road segment.

* * * * *